United States Patent
Henselmans

(10) Patent No.: US 12,044,520 B2
(45) Date of Patent: Jul. 23, 2024

(54) POSITIONING SYSTEM FOR POSITIONING AN OBJECT

(71) Applicant: DUTCH UNITED INSTRUMENTS B.V., Enschede (NL)

(72) Inventor: Rens Henselmans, Dordrecht (NL)

(73) Assignee: DUTCH UNITED INSTRUMENTS, Enschede (NL)

( * ) Notice: Subject to any disclaimer, the term of this patent is extended or adjusted under 35 U.S.C. 154(b) by 535 days.

(21) Appl. No.: 17/424,548

(22) PCT Filed: Feb. 7, 2020

(86) PCT No.: PCT/NL2020/050070
§ 371 (c)(1),
(2) Date: Jul. 21, 2021

(87) PCT Pub. No.: WO2020/162755
PCT Pub. Date: Aug. 13, 2020

(65) Prior Publication Data
US 2022/0074737 A1    Mar. 10, 2022

(30) Foreign Application Priority Data

Feb. 8, 2019 (NL) ........................ 2022539

(51) Int. Cl.
*G01B 11/24* (2006.01)
(52) U.S. Cl.
CPC .................... *G01B 11/24* (2013.01)
(58) Field of Classification Search
CPC .. G01B 11/24; G01B 2210/62; G01B 5/0009; G01B 21/04; G01B 5/008; G01B 7/008; G01B 11/005; G01B 21/047
See application file for complete search history.

(56) References Cited

U.S. PATENT DOCUMENTS 4,575,942 A * 3/1986 Moriyama .............. B23Q 1/34 33/1 M
5,699,621 A * 12/1997 Trumper ............... B23Q 1/621 33/DIG. 1

(Continued)

FOREIGN PATENT DOCUMENTS

| EP | 1519144 A1 | 3/2005 |
| EP | 3257621 A1 | 12/2017 |
| WO | WO-2020162755 A1 * | 8/2020 ........... G01B 11/005 |

OTHER PUBLICATIONS

International Search Report and Written Opinion for the International Patent Application No. PCT/NL2020/050070, dated Apr. 26, 2020, 9 pages.

*Primary Examiner* — Yaritza Guadalupe-McCall
(74) *Attorney, Agent, or Firm* — KDW Firm PLLC

(57) ABSTRACT

A positioning system for positioning an object includes a stacked stage system movable on a reference surface. The stacked stage system includes a driving system for driving the stacked stage system; a first stage driven along a driving plane parallel to the plane of the reference surface; and a main stage for supporting the object, the main stage arranged on the driven first stage for moving the main stage along the driving plane. The main stage includes a rotary drive system for rotating the main stage with respect to the first stage around an axis parallel to an out-of-plane direction perpendicular to the driving plane. The main stage is movable with respect to the first stage in the out-of-plane direction and further includes a support bearing to movably support the main stage on the reference surface in said out-of-plane direction.

19 Claims, 8 Drawing Sheets

(56) References Cited

U.S. PATENT DOCUMENTS

Figure 1:
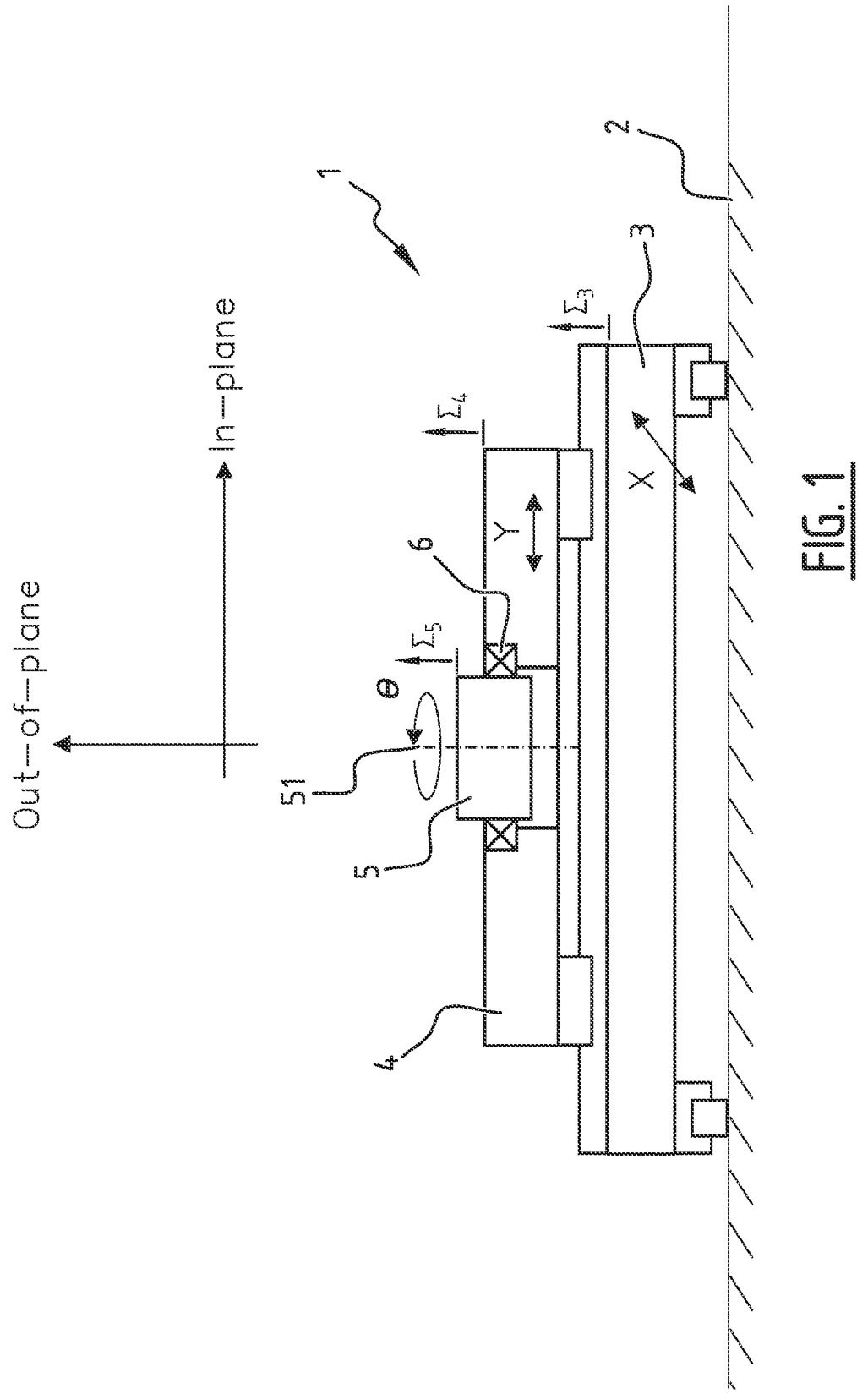

| | | | | |
|---|---|---|---|---|
| 5,760,564 | A * | 6/1998 | Novak | G03F 7/70716 |
| | | | | 318/135 |
| 5,812,407 | A * | 9/1998 | Sato | G05B 19/401 |
| | | | | 700/193 |
| 6,654,100 | B2 * | 11/2003 | Yoda | G03F 7/70708 |
| | | | | 430/311 |
| 7,492,468 | B2 * | 2/2009 | Henselmans | G01B 9/02003 |
| | | | | 356/508 |
| 9,898,000 | B2 * | 2/2018 | Budiman | G03F 7/70758 |
| 2001/0029674 | A1 * | 10/2001 | Cutler | B23K 26/04 |
| | | | | 33/573 |
| 2004/0233412 | A1 * | 11/2004 | Ono | G03F 7/70716 |
| | | | | 355/72 |
| 2004/0263108 | A1 * | 12/2004 | Lim | B23Q 17/2495 |
| | | | | 33/568 |
| 2010/0115671 | A1 * | 5/2010 | Pryadkin | H02N 2/028 |
| | | | | 29/25.35 |
| 2012/0127448 | A1 * | 5/2012 | Zhu | G03F 7/70733 |
| | | | | 355/72 |
| 2014/0152999 | A1 | 6/2014 | Kulawiec et al. | |
| 2022/0074737 | A1 * | 3/2022 | Henselmans | G01B 11/005 |

\* cited by examiner

POSITIONING SYSTEM FOR POSITIONING AN OBJECT

This is a national stage application filed under 35 U.S.C. § 371 of pending international application PCT/NL2020/050070, filed Feb. 7, 2020, which claims priority to Netherlands Patent Application No. NL 2022539, filed Feb. 8, 2019, the entirety of which applications are hereby incorporated by reference herein.

The present invention relates to a positioning system for, in particular, an optics measurement system to provide in-plane translation and rotation to an object, such as a sensor, tool or workpiece, with minimal out-of-plane position errors.

Traditional optical elements, such as lenses, comprise traditional optical surfaces which are spherical or have rotationally symmetric aspherical surfaces. Traditionally, these types of rotationally symmetric lenses are used for the design and construction of optical systems. Freeform surfaces form a relatively recent development for designing and producing optical elements and can be defined as surfaces without an axis of rotational invariance. Thereby, more complex, regular and irregular surface geometries can be formed and integrated into optical systems. Due to the increased degrees of freedom in the design of optical systems, it allows for building more compact and lighter optical systems with increased performance, compared to traditional optical systems.

To maximize the potential of this relatively new technology, manufacturing and measuring of such freeform surfaces must keep pace with the design capabilities. Obviously, designs can be as complex as allowed by the corresponding design theories and computational capabilities to apply these. However, if these designs cannot be made and measured, the full potential can not be achieved.

The surface quality and geometry of an optical element describes its optical design and also considers lens defects such as form errors, as scratches, chipping, holes or inclusions. Defects or deviations in the geometry can distort the image, reduce the optical throughput of the system and scatter diffuse light, thereby reducing the performance of the optical system. The measurement systems used for measuring the surface quality and geometry of a freeform surface need to be able to take into account much more variation in the surface of the optical element, when compared to a traditional optical element. Thereby, the measurement system needs to be able to move in more degrees of freedom, in order to keep track of the variations of the surface. In order to achieve this, metrology systems for freeform optical elements often comprise a relatively complex (and expensive) stacked stage system, comprising multiple high-precision stages for holding the optical measurement probe and/or the optical element that is to be measured. Such a system is for instance disclosed in European Patent Application EP 1519 144 A1.

The total positioning error of the optical measurement probe relative to the object to be measured needs to be as small as possible. Translation and rotation of the measurement probe is required to align it perpendicular to convex or concave optics. Hereby, the positioning error in the direction perpendicular to the surface of the optical element is most critical and needs to be in the nanometer (nm) range. This direction aligns with the in-plane direction of the stacked stages, where the position can for instance be measured according to EP 1519 144 A1.

Accuracy for linear and rotary stages, which are typically used for positioning in the in-plane directions, can be split in in-plane errors, which mainly originate from the accuracy of the drive systems and tolerances, due to for instance production, in the guidance systems, and out-of-plane errors that are due to tolerances in de guidance system.

In the out-of-plane direction of the stacked stages, also very strict criteria with respect to the out-of-plane positioning apply. As the stages are often stacked, positioning errors of the individual stages are summed and thereby lead to a total out-of-plane positioning error that is dependent on the positioning errors of all underlying stages. In order to meet the requirements on in particular the out-of-plane positioning error, large and expensive air-bearing supported stages are required with an extremely low positioning error, both in-plane and out-of-plane. This in turn leads to large, heavy and expensive metrology systems for measuring the surface of freeform optical elements.

It is a goal of the present invention, next to other goals, to obtain an improved, more compact and/or more efficient stacked stage positioning system for, in particular, an optics measurement system with a reduced positioning error and/or wherein at least one of the above mentioned problems is at least partially alleviated.

This goal, amongst other goals, is met by a positioning system for positioning an object, such as a sensor, tool and/or workpiece, in particular, an object in an optics measurement system, wherein the positioning system comprises a stacked stage system, wherein the stacked stage system is movable on a reference surface, wherein the stacked stage system comprises:

a driving system for driving the stacked stage system;
a first stage that is arranged to be driven along a driving plane parallel to the plane of the reference surface;
a main stage for supporting the object, wherein the main stage is arranged on the driven first stage for moving the main stage along the driving plane,
wherein the main stage system comprises a rotary drive system and wherein the rotary drive system is arranged for rotating the measurement unit of the main stage with respect to the first stage around an axis parallel to an out-of-plane direction perpendicular to the driving plane; and
wherein the main stage is movable with respect to the first stage in the out-of-plane direction and wherein the main stage further comprises a support bearing arranged to movably support the main stage on the reference surface in said out-of-plane direction.

As the main stage is movable in the out-of-plane direction with respect to the first stage, its positional accuracy in the out-of-plane direction is not dependent on the out-of-plane positional accuracy of an underlying stage in the stacked system. Instead, the out-of-plane positional accuracy of the main stage, and thereby of the object, such as a sensor, tool and/or workpiece, in particular, an object to be measured and/or measurement probe in an optics measurement system, with respect to the reference surface is dependent on the out-of-plane positional accuracy of the support bearing with the reference frame.

In other words, in traditional stacked stage systems the error in the out-of-plane direction of the final stage in the stack comprises a summation of the corresponding positioning errors of all the underlying stages, thus requiring expensive and heavy high-precision stages comprising, for instance, high precision air bearings with very low positioning errors. However, by supporting the main stage onto the reference surface by means of the support bearing, a stage system with improved accuracy is efficiently obtained. As the out-of-plane accuracy of the main stage is determined by the support bearing on the reference surface, it is possible to use cheaper and more compact stages with higher out-of-plane positioning errors, comprising for instance simple roller bearings, in the stack, while still achieving the target out-of-plane accuracy of the main stage.

Preferably, the main stage is supported directly on the reference surface, such that the relative position of the main stage in the out-of-plane direction is determined by said bearing. More preferably, as the main stage is movable with respect to the others stage in the out-of-plane direction, the out-of-plane position of the main stage is not determined by the out-of-plane position of the first or other stage in the positioning system. The main stage is preferably rigid, or comprises a rigid section, such that a predetermined and/or constant distance is kept between the (optical) measurement probe and/or the object to be measured that can be arranged on the main stage and the support bearing that supports the main stage on the reference surface. Additionally, or alternatively, the main stage comprises a linear drive system, wherein the linear drive system is arranged for moving the measurement unit of the main stage and/or the object to be measured with respect to the driving plane in the out-of-plane direction. This allows for accurate movably positioning of the measurement unit stage and/or the object to be measured in the out-of-plane direction. As the main stage is decoupled, in the out-of-plane direction, from the underlying stages, the positioning accuracy of the main stage in the out-of-plane direction is independent from the out-of-plane positioning accuracy of the underlying stages, thereby effectively canceling any strict requirements for out-of-plane positioning accuracy of the underlying stages.

Due to the fact that the freeform optical elements comprise surfaces that can be convex or concave, it is an advantage to have a rotational degree of freedom for the object, such as a sensor, tool and/or workpiece, in particular, an object to be measured and/or measurement probe in an optics measurement system, thereby allowing for the sensor to be kept perpendicular to the surface. The main stage may thereto be rotatable with respect to the first stage. The main stage is then movable in the out-of-plane direction with respect to the first stage and rotatable with respect to said first stage. It may however also be possible to provide a positioning system without such a rotary drive system. A high out-of-plane accuracy is then still obtained through movably supporting the main stage on the reference surface.

The positioning system as described is particularly suitable in high-precision machines, for instance generic position systems comprising a plurality of stages, preferably a plurality of stacked stages, that require an accurate relative positioning and/or movement between different objects, such as a workpiece, tool and/or sensor, in the in-plane direction, while requiring an accurate relative position in the out-of-plane direction. The positioning system is thereby particularly suitable for an optics measurement system that require an accurate positioning and/or movement of the (freeform) optical element to be measured with respect to a (optical) measurement probe in the in-plane direction, while maintaining an accurate relative position in the out-of-plane direction.

In a preferred embodiment the first stage comprises a central opening for receiving the support bearing of the main stage. Thereby the main stage is centrally located within the first stage, such that the main stage is enclosed by the first stage and can easily be driven in in-plane directions by the first stage. Preferably, the support extends through the opening in the first stage, thereby achieving a stable and efficient support on the reference surface.

In a preferred embodiment the stacked stage system further comprises a second stage that is arranged to be driven along a plane parallel to the plane of the reference surface, wherein the first stage is arranged on the second stage, wherein the first stage is arranged for moving in a first direction and the second stage is arranged for moving in a second direction perpendicular to the first direction. In such a setup both stages are preferably arranged to move in only a single direction, while still enabling the main stage to move over in the full 2D plane. These stages can be, for instance, relatively simple 1D linear stages, such that a less complex and less expensive positioning system is obtained. Although it is not essential that the displacement directions of the stages are perpendicular to each other, a setup wherein the stages are mounted perpendicular to each other does have the advantage that, for the in-plane positioning of the main stage, the first and second stages can be individually controlled, thereby simplifying the control system required for driving such a positioning system.

This setup is not limited to linear stages, but can comprise all types of stages. As an example, the second stage could be a rotational stage that is arranged to rotate around an axis which is parallel to the out-of-plane direction, whereas the first stage that is arranged on top of the second stage would be a linear stage in this example, such that the main stage can be driven to move in all the in-plane directions.

It should also be noted that, in a traditional stacked stage positioning system, the out-of-plane positioning error of the second stage would be added to the out-of-plane positioning error of the first stage, such that it would be difficult (and expensive) to fulfill the strict requirements on the out-of-plane positioning accuracy. In fact, the more stages that are stacked in the stacked stage system, the more inaccuracies will start to accumulate and the harder it will become to satisfy positional accuracy requirements. Thus, even in the setup of two further stacked stages next to the main stage, the main stage will be supported on the reference surface, such that the out-of-plane position of the main stage is dictated by the reference surface and will not, or at least hardly, be influenced by any positional errors in the out-of-plane directions of the two other stages.

It is further mentioned that although the invention is particularly beneficial in a stacked multi-stage system, supporting a main stage on the reference surface may also improve the accuracy of multi stage positioning system without or with only a limited stacked configuration, or in other words comprising only a main and first stage.

In a preferred embodiment the support bearing comprises an air bearing, preferably for forming a thin film of pressurized gas between the reference surface and a lower end of the support bearing. The use of an air bearing allows for an accurate positional control of the out-of-plane displacement of the bottom surface of the support bearing with respect to the reference surface, while at the same time a low friction between the support bearing and the support surface is obtained in, preferably, three degrees of freedom. As the support bearing supports the main stage, preferably directly, a very low positioning error in the out-of-plane direction of the main stage is obtained.

In a further preferred embodiment, the positioning system comprises a pre-loading subsystem that is arranged for biasing main stage towards the reference surface, preferably for biasing the support bearing towards the reference surface. Hereby the out-of-plane position of the support bearing with respect to the reference surface is kept substantially constant, such that the out-of-plane position of the main stage with respect to the reference surface is also kept substantially constant and the required positional accuracy can be obtained.

Preferably, the pre-loading subsystem is arranged on the first stage for biasing the support bearing from the first stage towards the reference surface. By arranging the pre-loading subsystem on the first stage, the pre-loading system is arranged to move with the main stage, thereby avoiding relative movement between the pre-loading subsystem and the main stage in the in-plane directions and allowing for a less complex construction of the pre-loading subsystem. Alternatively, or additionally, it is preferred that the positioning system comprises a biasing element arranged between the support bearing and the first stage. Example of such a biasing element are, for instance, coil springs, air (or hydraulic) piston, elastomeric elements and any other type of element that can exert a force to urge the support bearing towards the reference surface. Unwanted relative movements between the support bearing and the reference surface can be effectively suppressed by any of these solutions, thereby fulfilling the strict requirements on the positioning accuracy of the main stage. Note that the pre-loading subsystem can also be arranged on one of the underlying stages, other than the first stage, although this requires that the pre-loading subsystem is arranged for allowing relative movements between the pre-loading subsystem and the main stage in at least one of the in-plane directions. An advantage of such a setup is that reaction forces, as a result of biasing the support bearing, are introduced at lower stages in the stack. Thereby, the reaction forces, which could be relatively large, need to be transferred through a limited number of stages in the stack only.

In any of the embodiments comprising a pre-loading subsystem, it is further preferred that a rotary bearing is provided in between the pre-loading subsystem and the first stage, whereby the rotary bearing is preferably arranged for allowing a relative rotation of the pre-loading system with respect to the first stage around the axis parallel to the out-of-plane direction. If the main stage is rotated with respect to the first stage around the axis parallel to the out-of-plane direction, a relative rotation will also occur in the pre-loading subsystem. It is then preferred if a bearing is provided between the pre-loading subsystem and the first stage, such that pre-loading subsystem is arranged to rotate with the main stage. Thereby reliable operation of the pre-loading subsystem is ensured, while at the same time minimizing frictional losses due to the relative rotation of the main stage.

Alternatively, or additionally, it is preferred that the pre-loading subsystem comprises a gas system for supplying gas between the first stage and the support bearing. Preferably, one of the first stage and the support bearing comprises a piston cylinder for receiving a piston of the other of the first stage and the support bearing piston, wherein the gas system is arranged to supply gas in the piston cylinder. By regulating the supply of gas to the pre-loading subsystem, the force with which the support bearing is urged towards the reference surface can be regulated.

In any of the embodiments comprising a pre-loading subsystem, it is further preferred that the pre-loading subsystem comprises attracting means, preferably a vacuum system for creating a vacuum between the support bearing and the reference surface. By providing a vacuum between the support bearing and the reference surface, the support bearing will also be urged by a tractive force, and thereby biased, towards the reference surface. Additionally, or alternatively, it is preferred that the pre-loading subsystem comprises at least one magnetic element as attracting means for generating a magnetic force between the support bearing and the reference surface. Again a tractive force is generated between the support bearing and the reference surface, whereby the support bearing is urged towards the reference surface. In case that there is, for instance, not sufficient space in between the first stage and the main stage for mounting parts of the pre-loading system, the variants that are based on tractive forces could be attractive solutions for biasing the support bearing towards the reference surface.

In a preferred embodiment, the positioning system further comprises a rotary bearing arranged between the first stage and the main stage and at least a flexible section arranged for flexibly supporting the rotary bearing on at least one of the main stage or first stage for allowing relative movement between the main stage and first stage in the out-of-plane direction. The flexible section is arranged for fixedly holding the bearing, whereby it is still allowed to move in the out-of-plane direction. This enables the relative motion that is required for decoupling the out-of-plane movements of the first stage and the main stage. Thereby a rotational bearing can be used for only allowing the rotational movement of the main stage. Otherwise more complex, or less reliable, roller, air or sliding bearing would be required for allowing the rotation and the out-of-plane direction.

It is further preferred that the flexible section comprises at least two parallel leaf spring elements, wherein the leaf spring elements are arranged substantially parallel to the reference surface and wherein the leaf springs are arranged at a distance from each other as seen in the out-of-plane direction. Alternatively or additionally, by careful design of the flexible section and the parallel leaf spring elements, an urging force in the direction of the reference surface is generated through an elastic deformation of the leaf spring elements. Thereby the flexible section generates at least a part of the urging force that a pre-loading subsystem would normally generate. This can significantly reduce the complexity of the pre-loading subsystem, or even eliminate the need for the pre-loading subsystem.

Alternatively, the flexible section is arranged to be substantially unloaded in at least the out-of-plane direction when in a rest position, wherein the stacked stage system is arranged on the reference surface and the main stage is supported on the reference surface. Hereby, substantially no out-of-plane (reaction) forces are introduced by the flexible section onto the first stage near the main stage and/or the main stage, as these could lead to deformations resulting in a reduction of the positioning accuracy. Preferably, the stiffness of the flexible section around its rest position is substantially zero, such that any deformations occurring during driving of the stage system are substantially lower, preferably a factor of 100 lower, more preferably a factor of 1000 lower, when compared to a pre-loading force generated by the pre-loading system. Hereby, disturbances near the main stage can be reduced or minimized.

In a preferred embodiment the driving system comprises a precision drive, such as a ball-screw spindle or linear motor or planar motor. These precision drives can be accurately driven in the in-plane direction, thereby obtaining a positioning system that has a very low positioning error in the in-plane and out-of-plane directions.

This goal, amongst other goals, is also met by a measurement system for determining geometrical properties of an object to be measured, such as an (freeform) optical element, wherein the measurement system comprises a measurement unit, in particular a (optical) measurement probe, and a positioning system, in particular according to any of the aforementioned embodiments, for positioning one of the object and measurement unit with respect to the other of the object and measurement unit;
   wherein the positioning system comprises a stacked stage system, wherein the stacked stage system is movable on a reference surface, wherein the stacked stage system comprises:
      a driving system for driving the stacked stage system;
      a first stage that is arranged to be driven along a driving plane parallel to the plane of the reference surface;
      a main stage for supporting the object, wherein the main stage is arranged on the driven first stage for moving the main stage along the driving plane, wherein the main stage is movable with respect to the first stage in the out-of-plane direction and wherein the main stage further comprises a support bearing arranged to movably support the main stage on the reference surface in said out-of-plane direction.

Hereby a measurement system comprising a positioning system, that can employ cheaper and more compact stages, with an improved positional accuracy in the in- and out-of-plane directions is obtained.

In a preferred embodiment of the measurement system, the main stage system comprises a rotary drive system and wherein the rotary drive system is arranged for rotating the main stage with respect to the first stage around an axis parallel to an out-of-plane direction perpendicular to the driving plane. The rotary drive system is beneficial when measuring the geometrical properties of freeform objects, such as freeform optical elements, that can be convex and concave, as it allows for keeping the sensor perpendicular to the surface to be measured.

The present invention is further illustrated by the following figures, which show preferred embodiments of the positioning system according to the invention, and are not intended to limit the scope of the invention in any way, wherein:

FIG. 1 schematically shows a positioning system of the prior art in a frontal view.

Figure 2:
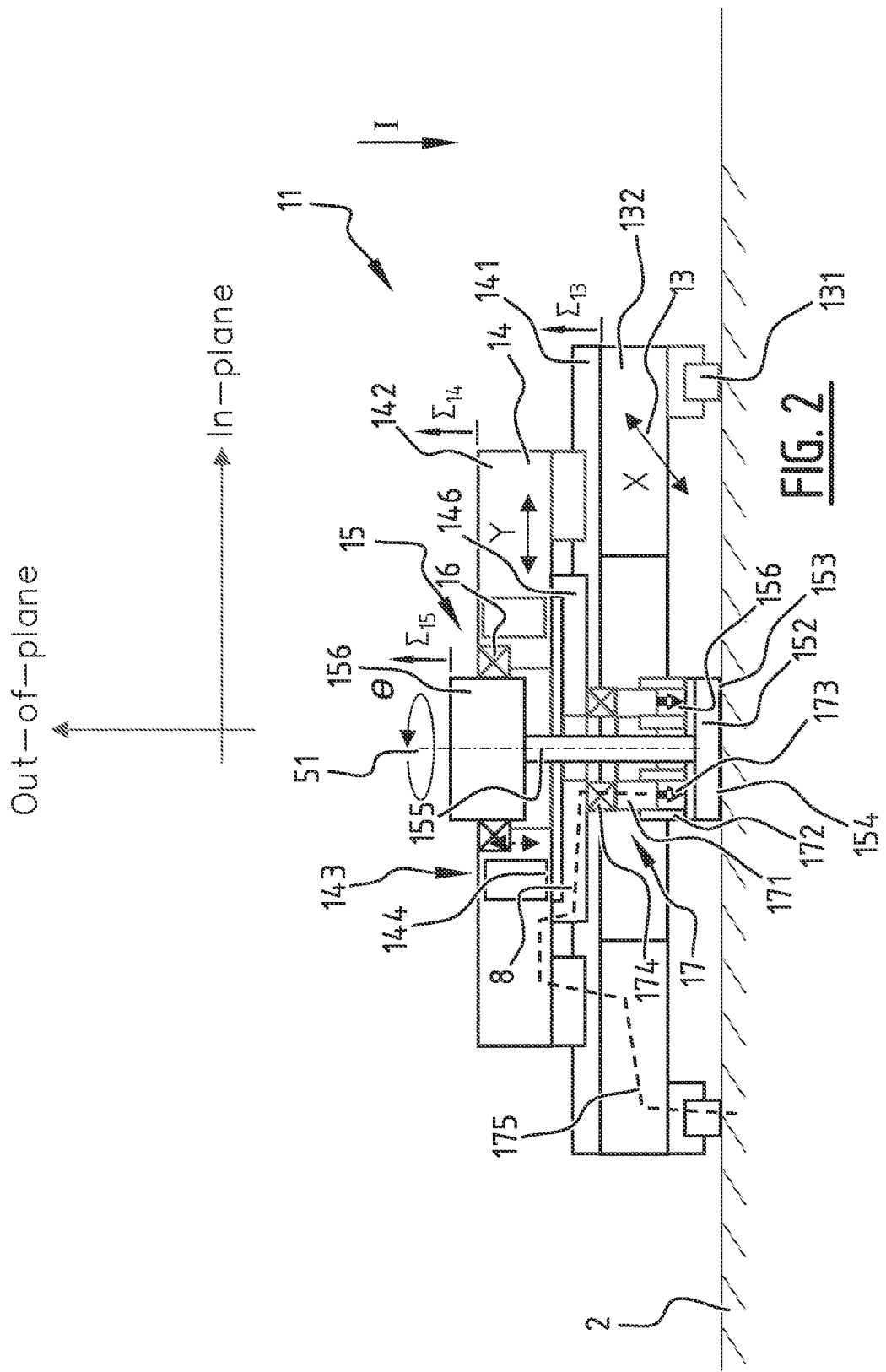

FIG. 2 schematically shows an embodiment of the positioning system according to the invention in a frontal view.

Figure 3:
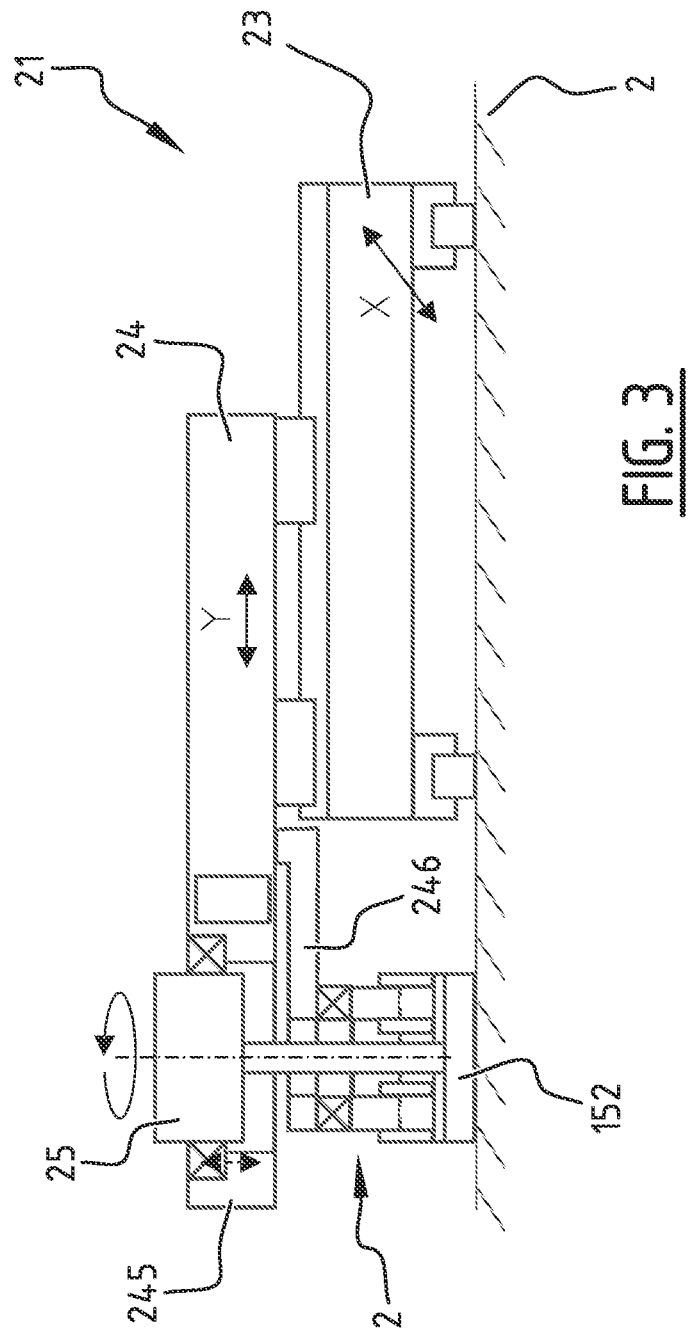

FIG. 3 schematically shows an asymmetric embodiment of the positioning system according to the invention in a frontal view.

Figure 4:
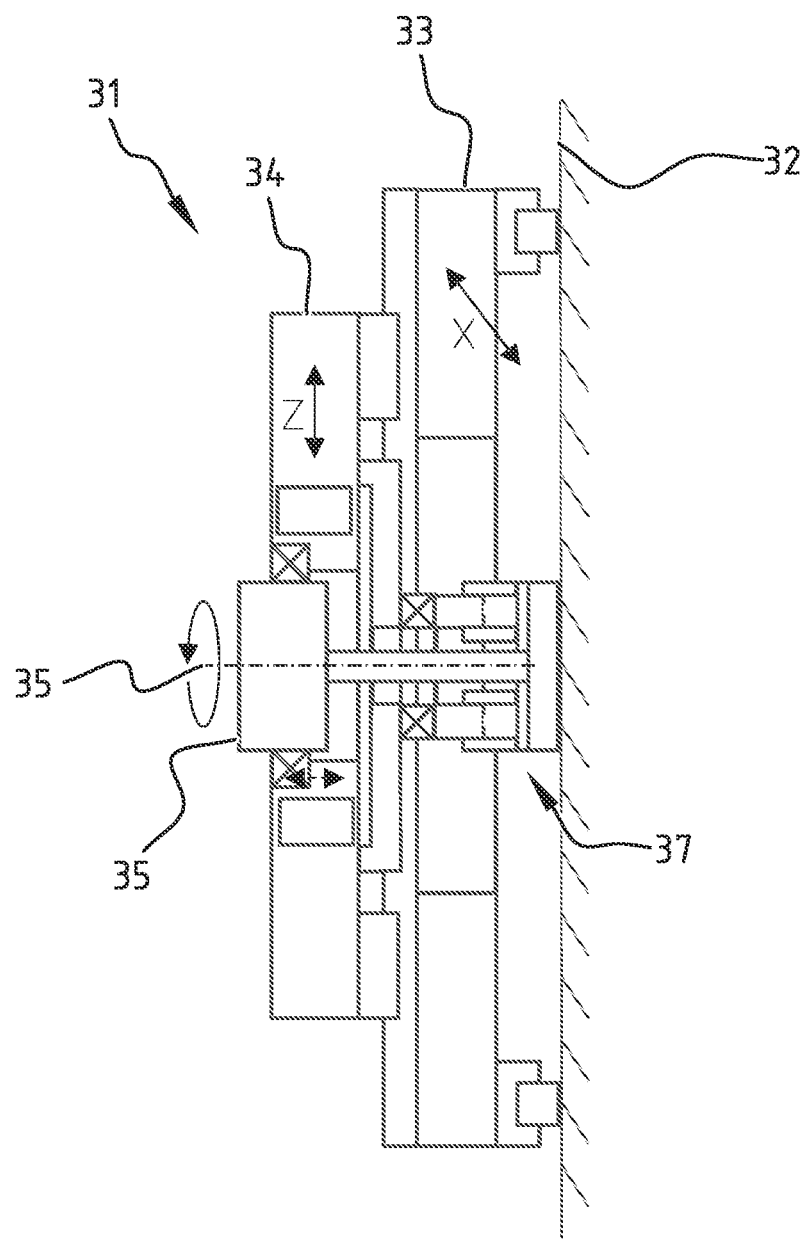

FIG. 4 schematically shows a wall-mounted embodiment of the positioning system according to the invention in a frontal view.

Figure 5:
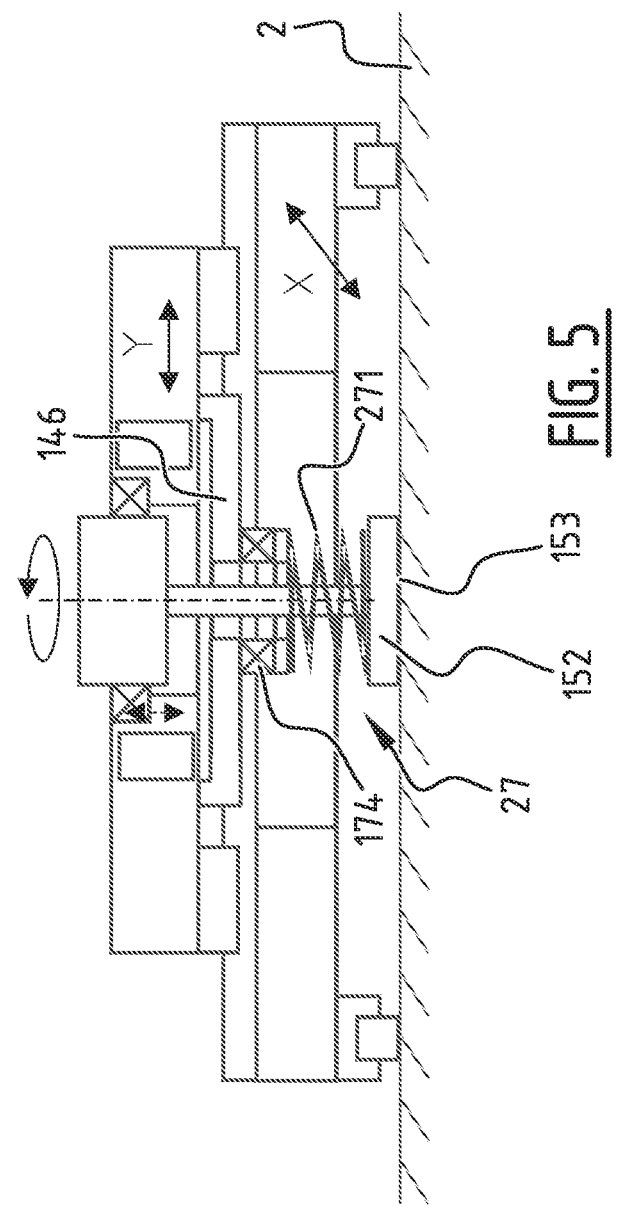

FIG. 5 schematically shows an embodiment of the positioning system comprising a pre-loading system with a compression spring according to the invention in a frontal view.

Figure 6:
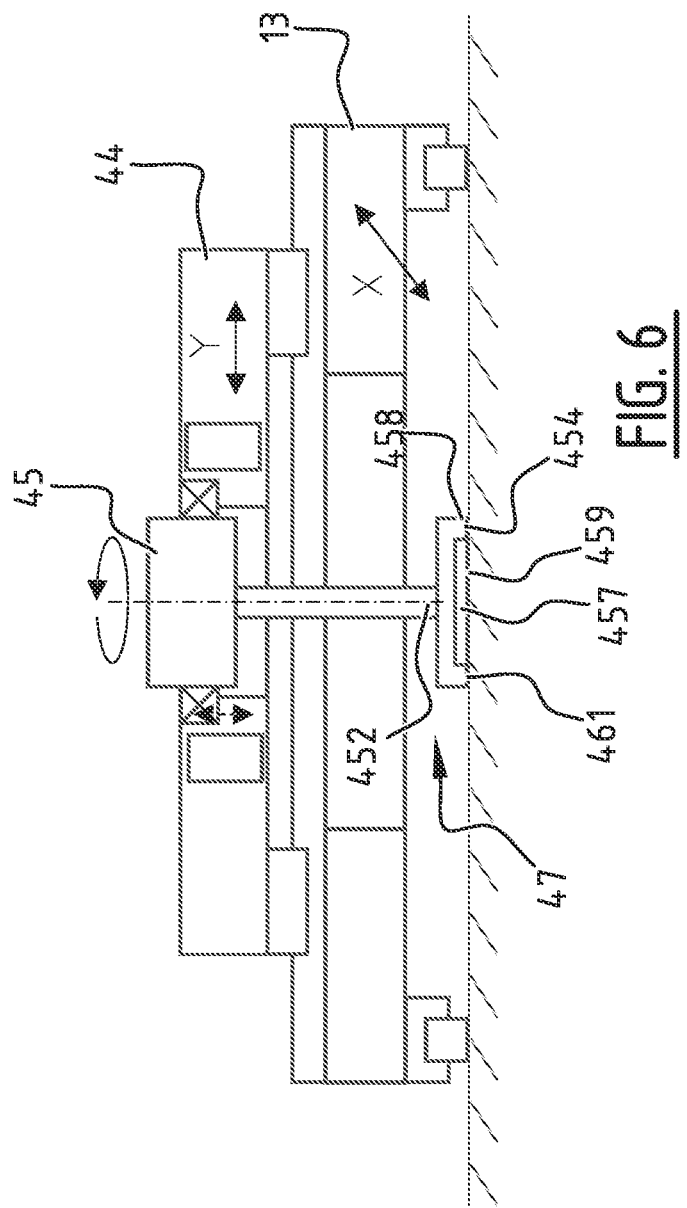

FIG. 6 schematically shows an embodiment of the positioning system comprising a pre-loading system with a vacuum system according to the invention in a frontal view.

Figure 7:
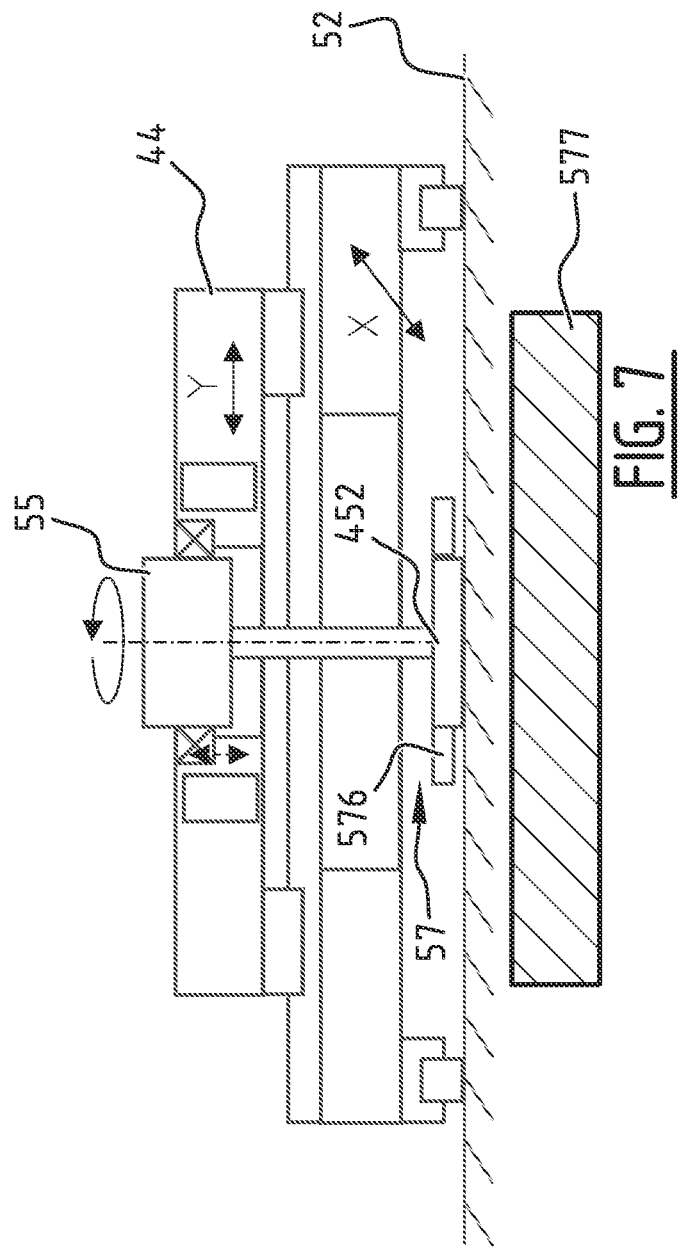

FIG. 7 schematically shows an embodiment of the positioning system comprising a magnetic pre-loading system according to the invention in a frontal view.

Figure 8:
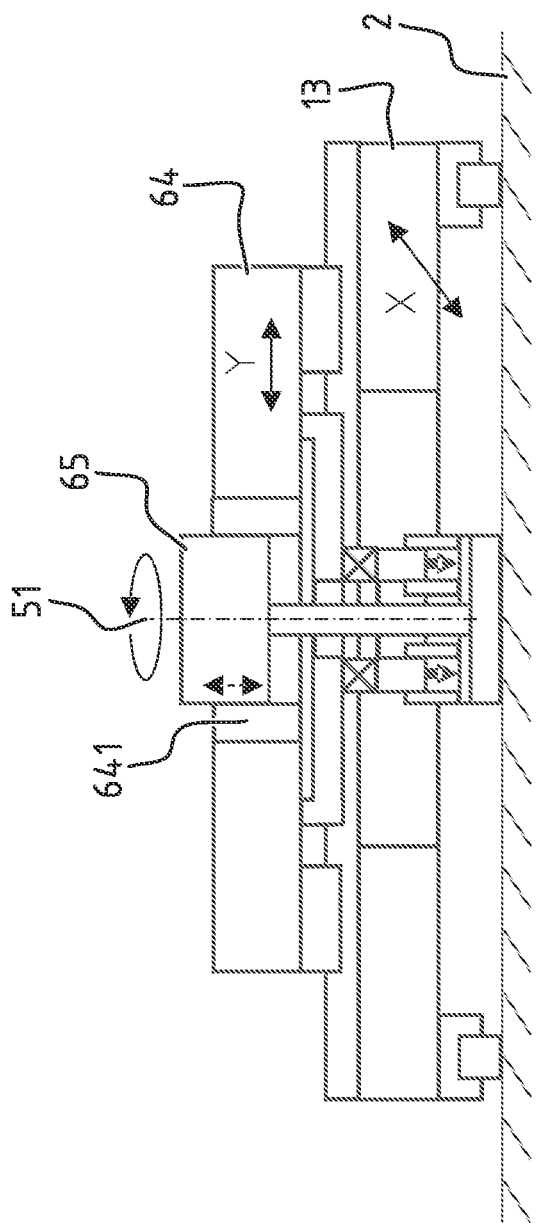

FIG. 8 schematically shows an alternative embodiment of the positioning system according to the invention in a frontal view. In this embodiment an alternative mounting, using a bushing, of the main stage onto the first stage is employed.

A positioning system comprising a stacked stage system 1 according to the prior art is shown in FIG. 1. Note that only the guidances are shown; the drive system can be of any type, such as direct drive, lead screw, ball screw etc. The stacked system 1 comprises three stacked stages, a linear X-stage 3 that is arranged on the reference surface 2, a linear Y-stage 4 that is arranged on the X-stage 3 and a rotational θ-stage 5 that is arranged on the linear Y-stage 4 by means of bearing 6 and is arranged to rotate around an axis of rotation 51 that is perpendicular to the reference surface 2. Due to production tolerances, surface roughness's and the like, the stages will typically have some positioning errors. Consequently, due to the stacking, the positioning accuracy of a stacked stage is dependent on the positioning accuracy of the underlying stage.

As such, the positioning error in the out-of-plane direction of the linear X-stage 3 is dependent on its own, isolated positioning error that is a function of its X-position $\in_x(X)$ and the surface quality of the reference surface and the guidance that the stage runs on $\in_{rf}(X,Y)$ that is again a function of the in-plane position of the reference surface. Hence, the total positioning error of the X-stage 3 $\in_3(\in_x, \in_{rf})$ is a function of the isolated positioning error of the stage itself and also of the surface quality of the underlying reference surface. In general it can thus be stated that the following typically holds:

$$\max(|\in_3|) \geq \max(|\in_{rf}|, |\in_x|),$$

or in other words, that the maximum absolute out-of-plane positioning error of the X-stage arranged on the reference surface is typically larger than the maximum absolute out-of-plane positioning error of either the stage itself, or the surface quality of the underlying reference surface. Hence, the maximum absolute out-of-plane positioning error will only increase if more stages are added to the stack. Thus, if Y-stage 4 is added:

$$\max(|\in_4|) \geq \max(|\in_3|, |\in_Y|),$$

wherein $\in_Y$ is the out-of-plane positioning error of the isolated Y-stage and $\in_4$ is the total out-of-plane positioning error at the Y-stage. By adding the rotational θ-stage 5:

$$\max(|\in_5|) \geq \max(|\in_4|, |\in_\theta|),$$

wherein $\in_\theta$ is the out-of-plane positioning error of the isolated rotational θ-stage and $\in_5$ is the total out-of-plane positioning error at the rotational θ-stage. Hence, positioning errors tend to increase by the stacking of ever more stages.

FIG. 2 schematically shows an embodiment of the positioning system. In this embodiment the first stage 13 and second stage 14 that are arranged to respectively move along the X- and Y-directions that make up the in-plane directions parallel to the reference surface 2, are shown. As such, the first stage 13 is also referred to as the X-stage 13 and the second stage 14 is also referred to as the Y-stage 14. The reference surface 2, which is often also referred to as a surface plate, is often a large granite block or plate that has been machined to satisfy strict flatness and surface roughness requirements. The X-stage 13 is provided on top of the reference surface 2. In this specific example the X-stage 13 comprises a guiding member 131, such as a rail or the like, that has been positioned on the reference surface 2 and a movable carriage 132 that runs over the guiding member 131. The Y-stage 14 is arranged on the X-stage 13 and is arranged to move in the Y-direction that is perpendicular to the direction of movement of the X-stage 13. In this specific example, the Y-stage comprises a guiding member 141, such as a rail or the like, that has been positioned on the carriage 132 of the X-stage 13, and a movable carriage 142 that runs over the guiding member 141. A third stage 15 is provided, that is arranged on the linear Y-stage 14 by means of bearing 16 and is arranged to rotate around an axis of rotation 51 that is perpendicular to the reference surface 2. The X- and Y-stages 13, 14 are thus arranged for driving the third stage 15 in the in-plane directions. This third stage 15 is the rotational θ-stage and is arranged for holding an object (not shown here), such as a sensor, tool, workpiece, traditional or freeform optical element, and/or is arranged for holding measurement unit (not shown here) comprising, for instance, an optical measurement probe.

This third stage 15, which is also often referred to as the main stage, is provided through a center opening in the underlying Y-stage 14 and also passes through the X-stage 13 and is supported directly on the reference surface 2 by means of a sliding, or generally moveable, bearing 152.

As the third stage 15 is directly supported on the reference surface 2, the out-of-plane positioning error is no longer dependent on the out-of-plane positioning errors of the underlying stages in the stack. Instead, it is dependent on the surface quality of the reference surface 2 and the ability of the air bearing 152 to maintain a constant air gap 153 between the lower surface 154 of the air bearing and the reference surface 2. This obviously significantly reduces the out-of-plane positioning error requirements of the X- and Y-stages 13, 14, such that compacter, lighter and cheaper stages can be used for obtaining a positioning system with a very high out-of-plane positioning accuracy.

The total positioning error of the Y-stage 14 is still dependent on the out-of-plane positioning error of the isolated Y-stage 14 $\in_Y$ and the total positioning error of the X-stage 13 $\in_{13}(\in_x, \in_{rf})$, such that:

$$\max(|\in_{14}|) \geq \max(|\in_{13}|, |\in_Y|), \max(|\in_{13}|) \geq \max(\in_{rf}, \in_x),$$

whereby the total positioning error of the X-stage 13 $\in_{13}(\in_x, \in_{rf})$ is a function of the isolated positioning error $\in_x$ of the stage itself and also of the surface quality $\in_{rf}$ of the underlying reference surface. However, by adding the rotational θ-stage 15 according to the embodiment shown in FIG. 2, the out-of-plane positioning error of the rotational θ-stage 15 is not dependent on the out-of-plane positioning errors of the underlying stages. Instead, the out-of-plane positioning error of the rotational θ-stage 15 is only a function of the surface quality $\in_{rf}$ of the underlying reference surface and, possibly, an out-of-plane positioning error and/or manufacturing error $\in_\theta$ of the isolated rotational θ-stage 15 and, such that the following will typically hold:

$$\max(|\in_{15}|) \geq \max(|\in_{rf}|, |\in_\theta|).$$

Hence, positioning error of the third (and in this example last) stage 15, the rotational θ-stage, is decoupled from the positioning errors of the stages in the underlying stack.

This bearing is an air bearing in this example, wherein the width of the air gap 153 between the reference surface 2 and the lower surface 154 of the air bearing is controlled with a high precision. A connecting portion 155 is arranged between the top section 156 of the third stage 15 and the air bearing 152. A flexible portion 143 is arranged in between the carriage 142 of the Y-stage 14 and the rotational bearing 16 holding the third, rotational, stage 15. The flexible section 143, that comprises a number of leaf spring elements 144, has a low stiffness in the out-of-plane direction, while fixedly holding the rotational bearing 16, that is connected to the third stage 15, with respect to the Y-stage 14 in all other directions. The leaf springs 144 are arranged to bend in the out-of-plane direction and are provided in series of two, wherein, within a series, the leaf springs 144 are oriented parallel to each other and facing each other in the out-of-plane direction. Thereby, the third stage 15 is only allowed two relative movements with respect to the Y-stage 14. Firstly, the bearing 16 ensures that the third stage 15 can rotate with respect to the Y-stage 14 around the out-of-plane axis 51 and secondly, the flexible section allows for the relative movement in the out-of-plane direction of the rotational bearing 16 and the third stage 15 with respect to the Y-stage.

In order to ensure an as constant as possible air gap 153 between the lower surface 154 of the air bearing 152 and the reference surface 2, the air bearing 152 is biased towards the reference surface 2. This bias is arranged by a pre-loading subsystem 17 for providing a force for urging the third stage 15 towards the reference surface 2. The pre-loading subsystem 17 comprises a mutually cooperating air piston 171 and air cylinder 172, wherein one of the two is connected to the third stage 15. In the current embodiment, the air cylinder 172 is connected to an upper surface 156 of the air bearing 152 and thereby also to the third stage 15. Note that this arrangement can easily be reversed, such that the air piston 171 is connected to the third stage 15.

By supplying gas to the mutually cooperating air piston 171 and air cylinder 172 a pressure build-up in the enclosed space 173 is generated, thus leading to an urging force applied onto the third stage 15 in the direction of the reference surface, indicated with arrow I in FIG. 2. The other of the mutually cooperating air piston 171 and air cylinder 172 is connected to the Y-stage 14, such that the reaction force associated to the urging force is transferred in a load path 175 through the Y-stage 14 and the X-stage 13 into the reference surface 2 or a fixed earth point. In the embodiment shown in FIG. 2, the air piston 171 is connected to the Y-stage through a rotational bearing 174 of the pre-loading system 17. The rotational bearing 174 is mounted in a subframe 146 that is rigidly mounted to the movable carriage 142 of the Y-stage 14. In order to provide for a strong and stiff load path 175, the subframe 146 has to connect to a portion of the movable carriage that is apart from the flexible section 143 to ensure a proper functioning of the pre-loading mechanism 17.

The mutually cooperating air piston 171 and air cylinder 172 are, in this embodiment, are thus arranged to rotate together around the axis of rotation 51. It is noted that the pre-loading subsystem 17 can also comprise a number of mutually cooperating air pistons 171 and air cylinders 172. It is further noted that the mutually cooperating air piston 171 and air cylinder 172 can also be formed such as to enclose a ring-shaped enclosed space 173. In order to prevent gas leakage of the mutually cooperating air piston 171 and air cylinder 172 a sealing member (not shown), such as an O-ring, can be applied in between the mutually cooperating air piston 171 and air cylinder 172. As the mutually cooperating air piston 171 and air cylinder 172 are fully axisymmetric in that case, they can also be arranged as to rotate with respect to each other around the rotation axis 51. Thereby, the mutually cooperating air piston 171 and air cylinder 172 would also form a rotational bearing, thus eliminating the need for the separate rotational bearing 174 for the pre-loading system 17. In such an arrangement, the other of the mutually cooperating air piston 171 and air cylinder 172 is fixedly connected to the Y-stage 14, such that it cannot rotate around the axis of rotation 51. A sealing member, that is arranged to reduce the gas leakage, will have to be arranged such that it can handle the relative rotation between the mutually cooperating air piston 171 and air cylinder 172. An O-ring, for example, is typically less suited for (smoothly) allowing this relative rotation.

The gas supply used for suppling gas to the air bearing 152 can be combined with the gas supply for supplying gas to the mutually cooperating air piston 171 and air cylinder 172, such that a singly supply line (not shown) would be needed. The gas supply means (not shown) could either be located outside of the stacked stage system 11, or could even be integrated into one of the stages 13, 14, 15.

The stacked stage system 11 is furthermore provided with driving means for driving the stages, driving means for linear stages comprise, for instance, direct, lead screw, ball screw and/or belt drives, whereas the driving means for a rotational stage comprise, for instance, direct, gear, worm gear and/or belt drives.

Note that the three stages 13, 14, 15 comprised in stacked stage system 11 can be any type of stage. Hence, the X- and Y-stages 13, 14 can be interchanged, the lower stage could even be a rotation stage that rotates around the out-of-plane axis, whereon the X-, Y-stages are arranged. The third stage can also be a translational stage, or a stage that is arranged to rotate around an axis parallel to any of the in-plane directions. The number of stages in the stack can also vary.

FIG. 3 shows an alternative embodiment of the one shown in FIG. 2. The stacked stage system 21 again comprises an X-stage 23, a Y-stage 24 and a third, rotational, stage 25. In this embodiment however, the third stage 25 is provided through the underlying Y-stage 24 at a location near an edge 245 of the Y-stage 24. In this arrangement the third stage 25 is also not arranged through a middle of the X-stage 23, but is instead positioned adjacent the X-stage 23. The subframe 246 for retaining the pre-loading system 17 again transfers the reaction force due to biasing the air bearing 152 to the Y-stage 24 and then, through the X-stage 23, to the reference surface 2 which is to be considered the fixed earth. Note that, wherein the subframe 146, as shown in FIG. 2, can be supported on, as seen in the frontal view, two sides of the Y-stage 14, the subframe 246 is supported on only a single end of the Y-stage 24. Hence, care must be taken to ensure a proper strength and stiffness of the subframe 246. For the remainder, the embodiment is similar, or equal, to the embodiment of FIG. 2.

FIG. 4 shows the embodiment of FIG. 2, wherein the stacked stage system 31 is arranged on a vertical reference surface 32. Thereby, the stage nearest to the reference surface, i.e. the second stage, is still the X-stage 33. The stage stacked onto the X-stage 33, i.e. the first stage, is now the Z-stage 34 and the third, rotational, stage 35, is still arranged to rotate around an axis 351 parallel to the out-of-plane direction, with the difference that the axis 351 is now parallel to the Y-direction, instead of the Z-direction (as was the case in previous embodiments).

In this embodiment, a pre-loading subsystem 37 is highly preferred. Whereas in the previous embodiment, the gravity would contribute in urging the third stage 15, 25 towards the reference surface 2, in this embodiment the gravity works perpendicular with respect to the normal of the reference surface 32, thereby not contributing in biasing the third stage 35 towards the reference surface 32. However, the pre-loading subsystem 17 that was discussed for the embodiments of FIGS. 2 and 3 can directly be applied in this embodiment as well.

FIGS. 5-7 show pre-loading systems with alternative, or additional, means for biasing the air bearing 152 towards the reference surface 2. Pre-loading system 27, as shown in FIG. 5, features a compression spring 271 that is arranged for urging the air bearing 152 towards the reference surface 2. Compression spring 271 is connected to the subframe 146 by means of rotational bearing 174, whose construction is in essence equal to the embodiment shown in FIG. 2. In order to ensure proper biasing action, the compression spring 271 can be mounted with a pre-load, such that the air bearing 152 experiences an urging force towards the reference frame 2 under virtually all circumstances.

The width of the air gap 153 is now only controlled by regulating the flow and pressure of gas towards the air bearing 152, whereas in the embodiment of FIGS. 2-4, the width of the air gap 153 could be controlled by both regulating the flow and pressure of gas towards the air bearing 152, but also by regulating the flow and pressure of gas towards the mutually cooperating air piston 171 and air cylinder 172, thereby dynamically controlling the force amplitude and frequency of the urging force for urging the air bearing 152 downwards.

Note however, that the embodiments of FIGS. 2-5 can be combined, such that, as an example, the pre-loading system 17, 27 comprises a pre-loaded compression spring 152 and mutually cooperating air piston(s) 171 and air cylinder(s) 172. Hereby a more flexible setup in the arrangement of the pre-loading system is obtained.

In FIG. 6 another alternative is shown for biasing the air bearing 452 that supports the third stage towards the reference surface 2. A vacuum chamber 457 is arranged in the lower surface 454 of the air bearing 452. On a first part 461 of the lower end 454 of the air bearing 452 that is near its edge 458, means are provided for forming a thin film of pressurized gas between the reference surface 2 and the first part 461 of the lower end 454. Hence, this first part 461 of the lower end 454 of the air bearing 452 thus forms the air bearing section and ensures that the third stage 45 is movably supported on the reference surface 2. In a center portion 459 of the lower end of the air bearing, the vacuum chamber 457 is provided that is arranged for providing a vacuum and thereby for creating a suction force on the reference surface 2. This suction force thereby biases the air bearing 452 and thus the third stage 45 towards the reference surface 2. As the pre-loading subsystem 47 of this embodiment does not generate a reaction force that is transferred into the stacked stage system, there is also no need for sub frames and the like to facilitate transferring the reaction forces to the fixed earth, thereby simplifying the Y-stage 44 design.

In FIG. 7 yet another alternative is shown for biasing the air bearing 552 that supports the third stage 55 towards the reference surface 2. In this alternative a magnetic attractive force is generated between the third stage 55 and the reference frame 2. In the specific embodiment of FIG. 7 this is achieved by fitting the air bearing 552 and the reference surface 52 with magnetic and/or ferromagnetic elements. Alternatively, the reference surface can also be made from a ferromagnetic material. The magnetic elements can be permanent magnets and/or magnetic coils that are arranged attract magnetic and/or ferromagnetic elements that are mounted on the opposite side. The air bearing 552 is fitted with these magnetic and/or ferromagnetic elements 576, whereas on the opposite side, just below the reference surface 52, (electro)magnets and/or electromagnetic coils 577 are positioned. The electromagnets and/or electromagnetic coils 577 are arranged such that they span the full plane of movement of air bearing. An attractive force is thereby generated between the magnetic and/or ferromagnetic elements 576 and the (electro)magnets and/or electromagnetic coils 577. Similar to the embodiment of FIG. 6, the pre-loading subsystem 57 of this embodiment does not generate a reaction force that is transferred into the stacked stage system, there is also no need for sub frames and the like to facilitate transferring the reaction forces to the fixed earth, thereby simplifying the Y-stage 44 design.

FIG. 8 shows an alternative arrangement of the third stage 65 onto the Y-stage 64, wherein the third stage 65 is arranged in a bushing 641 that allows that the third stage 65 can rotate, with respect to the Y-stage 64, around the out-of-plane axis 51 and secondly it allows for the relative movement in the out-of-plane direction of the third stage 65 with respect to the Y-stage 64. Such a bushing 641 can be a sliding bearing, a ball bushing, air bushing or any other suitable type of bushing or bearing that allows for the relative movements. This embodiment can be combined with any of the aforementioned embodiments.

All the embodiments presented have the advantage that a positioning system with a stacked stage system is obtained with a very high out-of-plane positioning accuracy, wherein the out-of-plane positioning accuracy of the main stage is not dependent on the out-of-plane positioning accuracy of the underlying stages. It is explicitly noted that the different alternatives for biasing the third stage towards the reference surface can be interchanged and combined for forming a pre-loading subsystem. Note that the three stages comprised in stacked stage system can be any type of stage. Hence, the X-, Y- and Z-stages can be interchanged, the lower stage could even be a rotation stage that rotates around the out-of-plane axis, whereon X-, Y- and/or Z-stages are arranged. The third stage can also be a translational stage, or a stage that is arranged to rotate around an axis parallel to any of the in-plane directions. The number of stages in the stack can also vary, thereby comprising 2, 4 or even more than 4 stages. Also, the present invention is not limited to the embodiment shown, but extends also to other embodiments falling within the scope of the appended claims.

The invention claimed is:

1. A positioning system for positioning an object, wherein the positioning system comprises a stacked stage system, wherein the stacked stage system is movable on a reference surface, and wherein the stacked stage system comprises:
   a driving system for driving the stacked stage system;
   a first stage that is arranged to be driven along a driving plane parallel to the plane of the reference surface;
   a main stage for supporting the object, wherein the main stage is arranged on the driven first stage for moving the main stage along the driving plane; and
   wherein the main stage is movable with respect to the first stage in an out-of-plane direction perpendicular to the driving plane and wherein the main stage further comprises a support bearing arranged to movably support the main stage on the reference surface in said out-of-plane direction, such that the positional accuracy in the out-of-plane direction is not dependent on the out-of-plane positional accuracy of an underlying stage in the stacked system.

2. The positioning system according to claim 1, wherein the first stage comprises a central opening for receiving the support bearing of the main stage.

3. The positioning system according to claim 1, wherein the main stage comprises a rotary drive system and wherein the rotary drive system is arranged for rotating the main stage with respect to the first stage around an axis parallel to an out-of-plane direction perpendicular to the driving plane.

4. The positioning system according to claim 1, wherein the main stage is decoupled, in the out-of-plane direction, from the underlying stage, such that the positioning accuracy of the main stage in the out-of-plane direction is independent from the out-of-plane positioning accuracy of the underlying stage.

5. The positioning system according to claim 1, wherein the main stage is supported directly on the reference surface, such that the relative position of the main stage in the out-of-plane direction is determined by said support bearing.

6. The positioning system according to claim 1, wherein the stacked stage system further comprises a second stage that is arranged to be driven along a plane parallel to the plane of the reference surface, wherein the first stage is arranged on the second stage, wherein the first stage is arranged for moving in a first direction and the second stage is arranged for moving in a second direction perpendicular to the first direction.

7. The positioning system according to claim 1, wherein the support bearing comprises an air bearing for forming a thin film of pressurized gas between the reference surface and a lower end of the support bearing.

8. The positioning system according to claim 1, comprising a pre-loading subsystem that is arranged for biasing the support bearing towards the reference surface.

9. The positioning system according to claim 8, wherein the pre-loading subsystem is arranged on the first stage for biasing the support bearing from the first stage towards the reference surface.

10. The positioning system according to claim 8, comprising a biasing element arranged between the support bearing and the first stage.

11. The positioning system according to claim 8, wherein a rotary bearing is provided in between the pre-loading subsystem and the first stage, wherein the rotary bearing is arranged for allowing a relative rotation of the pre-loading system with respect to the first stage around the axis parallel to the out-of-plane direction.

12. The positioning system according to claim 8, wherein the pre-loading subsystem comprises a gas system for supplying gas between the first stage and the support bearing.

13. The positioning system according to claim 12, wherein one of the first stage and the support bearing comprises a piston cylinder for receiving a piston of the other of the first stage and the support bearing piston, and wherein the gas system is arranged to supply gas in the piston cylinder.

14. The positioning system according to claim 8, wherein the pre-loading subsystem comprises a vacuum system for creating a vacuum between the support bearing and the reference surface.

15. The positioning system according to claim 8, wherein the pre-loading subsystem comprises at least one magnetic element for generating a magnetic force between the support bearing and the reference surface.

16. The positioning system according to claim 1, further comprising a rotary bearing arranged between the first stage and the main stage and at least a flexible section arranged for flexibly supporting the rotary bearing on at least one of the main stage or first stage for allowing relative movement between the main stage and first stage in the out-of-plane direction.

17. The positioning system according to claim 16, wherein the flexible section comprises at least two parallel leaf spring elements, wherein the leaf spring elements are arranged substantially parallel to the reference surface and wherein the leaf springs are arranged at a distance from each other as seen in the out-of-plane direction.

18. The positioning system according to claim 1, wherein the driving system comprises a precision drive.

19. A measurement system for determining geometrical properties of an object to be measured, wherein the measurement system comprises a measurement unit and a positioning system for positioning one of the object to be measured and the measurement unit with respect to the other of the object to be measured and the measurement unit;

wherein the positioning system comprises a stacked stage system, wherein the stacked stage system is movable on a reference surface, and wherein the stacked stage system comprises:
a driving system for driving the stacked stage system;
a first stage that is arranged to be driven along a driving plane parallel to the plane of the reference surface;
a main stage for supporting the object, wherein the main stage is arranged on the driven first stage for moving the main stage along the driving plane, and wherein the main stage is movable with respect to the first stage in the out-of-plane direction and wherein the main stage further comprises a support bearing arranged to movably support the main stage on the reference surface in said out-of-plane direction.

* * * * *

UNITED STATES PATENT AND TRADEMARK OFFICE
CERTIFICATE OF CORRECTION

| | | |
|---|---|---|
| PATENT NO. | : 12,044,520 B2 | Page 1 of 1 |
| APPLICATION NO. | : 17/424548 | |
| DATED | : July 23, 2024 | |
| INVENTOR(S) | : Henselmans | |

It is certified that error appears in the above-identified patent and that said Letters Patent is hereby corrected as shown below:

On the Title Page

Item (73) Assignee, Please change "DUTCH UNITED INSTRUMENTS" to --DUTCH UNITED INSTRUMENTS B.V.--.

Signed and Sealed this
Fifth Day of August, 2025

Coke Morgan Stewart
*Acting Director of the United States Patent and Trademark Office*